Sept. 11, 1928.
H. M. CAMERON
COUNTER SCALE
Filed May 6, 1924
1,683,861
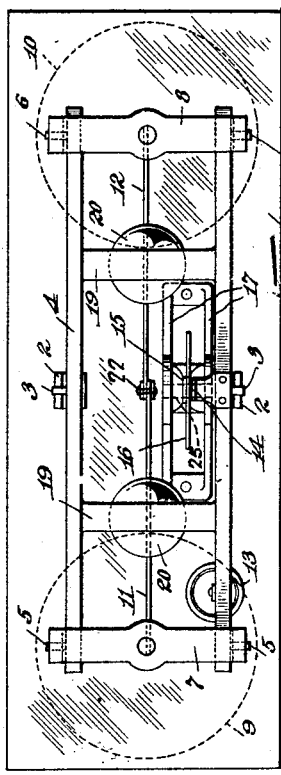
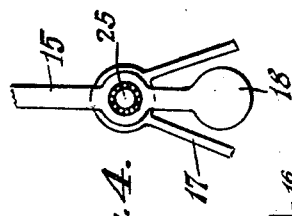
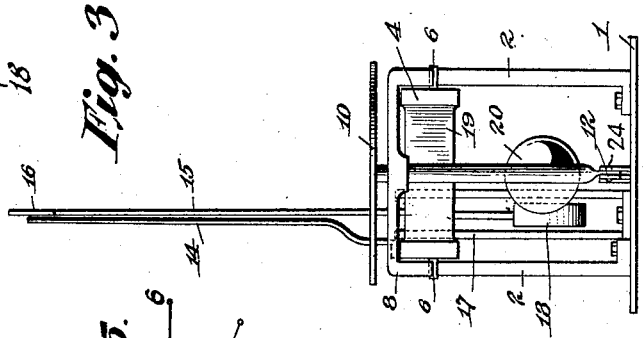
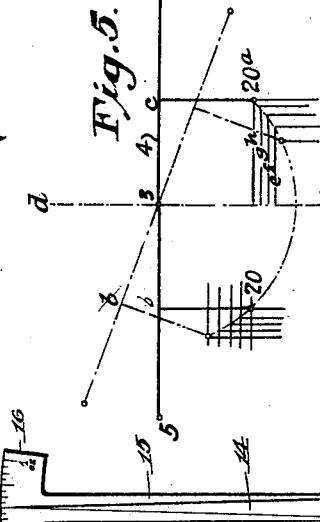
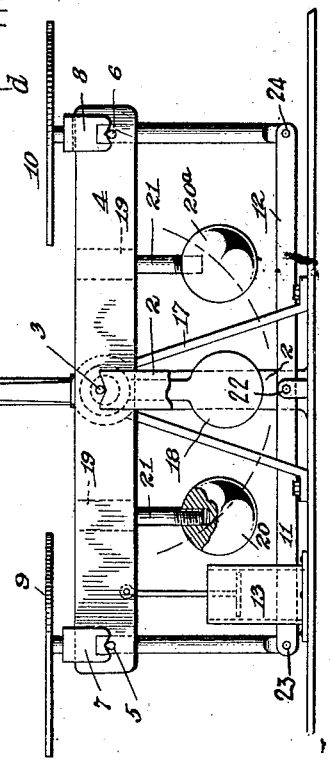

Patented Sept. 11, 1928.

1,683,861

UNITED STATES PATENT OFFICE.

HUGH M. CAMERON, OF NEW YORK, N. Y., ASSIGNOR TO ELDER & ROBINSON, A CO-PARTNERSHIP, OF CHICAGO, ILLINOIS, CONSISTING OF EARL B. ELDER, R. E. ROBINSON, AND A. W. ROBINSON.

COUNTER SCALE.

Application filed May 6, 1924. Serial No. 711,313.

The invention relates to scales of the even balance, counter type adapted for quick determination of exact weight, and has for its objects to produce such a scale which will automatically compensate for the movement, and correct the travel error of the beam due to the decrease in angular movement of the beam per equal increment of power applied to move the same; which will be self leveling; which will be of cheap and rigid construction, and which will not easily get out of order.

These and further objects will more fully appear in the following specification and accompanying drawings considered together or separately.

One embodiment of the invention is illustrated in the accompanying drawings, in which like parts in all of the several figures are designated by corresponding characters of reference, and in which Fig. 1 is a plan view of a simple form of counter scale embodying the invention.

Fig. 2 is a front elevation of the same, with parts broken away

Fig. 3 is an end elevation of the same.

Fig. 4 is a detail view of a form of bearing for the dial, and

Fig. 5 is a diagram showing the operation of the beam.

In the drawings 1 designates a base carrying a pair of standards 2 on which is pivoted, by means of knife edge bearings 3, an open beam or lever 4. The beam is provided at its opposite ends with knife edge bearings 5, 5 and 6, 6 on each pair of which is mounted a yoke 7 or 8 as the case may be, and each yoke carries a pan 9 or 10, the pans being above the pivotal line of the beam. The yokes 7 and 8 have pivoted to them links 11 and 12 respectively, which are pivoted to the base, as by means of a pin 22 in vertical alinement with the pivot 3. Each link is pivoted at 23 or 24, as the case may be, to an extension of its yoke, and said pivots are spaced from the pivot 22 the same distance the pivotal points 5 and 6 are spaced from the pivot 3, and the links will always be parallel to the beam 4 whereby to retain the pans in a position where their surfaces will always be in the horizontal position. The base carries a dash pot 13 the piston of which is carried by the beam whereby the movements of the beam will be damped, and a pointer or finger 14 is rigidly secured to and extends upward at right angles to the beam 4.

The apparatus as above described, is the usual counter scale on which a weight is placed on one pan 9 or 10 and the commodity to be weighed is placed on the other pan until the beam 4 reaches the position of equilibrium.

Pivotally carried on the base 1 and in line with the pivotal points of the beam 4 is an upwardly extending arm 15, the upper extremity of which carries a dial 16 with which the pointer 14 cooperates. The arm is carried in suitable bearings and, as shown, is mounted in standards 17 carried on the base 1. In the embodiment of the invention illustrated the dial arm 15 is mounted on roller bearings on a pin 25 carried by the standards 17 and in axial alinement with the pivoted point 3, as shown in Fig. 4. The arm 15 extends below the pivotal point thereof and carries a counterweight 18 whereby the arm will be maintained in the vertical position and the pointer 14 will coincide with the center or zero point of the dial when the beam 4 is in the horizontal position, notwithstanding the angular position of the base 1 relatively to the horizontal. The dial 16 may be relatively short, and in the drawings is illustrated as capable of measuring one ounce either side of the zero point, which is sufficient for ordinary counter use.

In the embodiment of the invention illustrated the beam 4 is provided with two cross bars 19, 19 one on each side of the pivotal point of the beam and equally spaced therefrom.

Depending from each bar, and preferably in the longitudinal center line of the beam 4, is a preferably spherical compensating weight or pendulum 20, 20$^a$, said weights being of equal specific gravity. The weights are rigidly secured to the beam 4 and at the same distance below the pivotal line thereof and at the same distance from but on opposite sides of the vertical plane of the pivotal line, therefore, as the centers of the weights are at the same distance from the pivotal point of the beam they will, when the beam moves on its pivot, travel in the same arc on either side of the pivotal point and in opposite directions relatively to the horizontal and vertical planes of the pivot 3 each correcting, or neutralizing, the travel error of the other and, because of the high specific gravity of the weights as compared to the beam or their distance below the same, the travel error of the beam will be corrected, to give any required compensation on the dial.

Preferably the weights 20 and 20$^a$ may be adjusted toward or away from the horizontal pivotal line of the beam. This adjustment may be accomplished by screw threading each weight on the lower end of an arm 21 the latter being integral with, or rigidly secured to, the beam.

As will be seen from the drawings, the pivot of the dial arm 15 is in axial alinement with the pivotal points 3, 3 of the beam 4.

The operation is as follows:—

With the parts in the position shown in Fig. 1 and in full lines in Fig. 5, a pound weight, for example, is placed in the pan 10 and the beam 4 and pendulums 20 and 20$^a$ will assume the position indicated in dot and dash line in Fig. 5. The commodity to be weighed is poured into the pan 9 and the beam will move toward its normal, balanced position. The pendulums, while traveling on the same arc have different values because of their positions relatively to the vertical line $d$—$d$ and the horizontal line 5—6. The value of the pendulum 20 will decrease as it is moved downward and toward the line $d$—$d$, and the value of 20$^a$ will increase as it approaches the line 5—6. This will compensate for the unequal angular movement of the beam and correct the travel error, and cause the beam to travel at the same angular speed and distance for each equal increment placed in the pan 9 whereby when 15 ounces are in the pan the pointer 14 will indicate 1 oz. on the right end of the dial. As each eighth ounce is placed on the pan the pointer will move one space on the dial whereby the exact weight will be quickly and easily obtained. Because of the fact that the movement of the beam is compensated for, and the travel error corrected, the calibrations on the dial are equidistant. If there be no such correction the distance between the marks would diminish toward the center and said marks would be so close together as to make reading difficult.

Each pendulum forms a lever pivoted at 3, the length of which is from the pivot to that point on the weight farthest removed from the pivot. As both of the pendulum levers are out of plumb with the pivotal point, the inertia of the beam will be overcome at the instant of movement of the beam and the latter will respond instantly to any weight placed in either pan. This feature is highly desirable when the scale is used in connection with automatic packaging devices.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed as new and desired to be secured by Letters Patent, is as follows:

1. A scale, comprising a centrally pivoted beam, a pair of pans carried by the beam and above the horizontal plane of the pivot, one of said pans being on each side of the vertical plane of the pivotal point, a pair of weights rigidly carried by the beam one on each side of the vertical plane of the pivot and below the horizontal plane of the pivotal point.

2. A scale, comprising a centrally pivoted beam, a pair of pans carried by the beam and above the horizontal plane of the pivot, one of said pans being on each side of the vertical plane of the pivotal point, a pair of weights rigidly carried by the beam one on each side of the vertical plane of the pivot and below the horizontal plane of the pivotal point, said weights being equidistant from the pivotal point.

3. A scale, comprising a centrally pivoted beam, a pair of pans carried by the beam and above the horizontal plane of the pivot, one of said pans being on each side of the vertical plane of the pivotal point, a pair of weights rigidly carried by the beam one on each side of the vertical plane of the pivot and below the horizontal plane of the pivotal point, said weights being of equal specific gravity and equidistant from the pivotal point.

4. A scale, comprising a centrally pivoted beam, a pair of pans carried by the beam and above the horizontal plane of the pivot, one of said pans being on each side of the vertical plane of the pivotal point, a pair of spherical weights rigidly carried by the beam one on each side of the vertical plane of the pivot and below the horizontal plane of the pivotal point, said weights being of equal specific gravity and equidistant from the pivotal point.

5. A scale including a centrally pivoted beam, having weighted pendulums at each side of the center thereof, a pointer midway of the beam and a floating weighted dial disposed adjacent said pointer.

6. A scale, comprising a centrally pivoted beam, a pointer rigidly secured to the beam and extending radially upward from the pivotal point, a pan carried at each end of the beam and above the pivotal point, a dial pivoted relatively to the beam and in axial alinement with the pivot of the beam and cooperating with the pointer, a weight carried by the dial and below its pivot whereby the dial will be plumb irrespective of the angularity of the beam or of the scale as a whole, a compensating weight carried by the beam between its pivot and each pan, said weights being below the pivotal point and equidistant from the pivotal point and of equal specific gravity.

7. A scale, comprising a base, a pivoted beam carried by the base, a member carried on the base and pivoted in axial alinement with the pivotal point of the beam, said member being pivoted relatively to the beam, a depending weight carried by the member and below the pivot thereof whereby said member will remain in constant position irrespective of the angular position of the base.

8. A scale, comprising a centrally pivoted beam, a pair of pans carried by the beam and above the horizontal plane of the pivot, one of said pans being on each side of the vertical plane of the pivotal point, weighted means rigidly suspended from the beam on each side of the vertical plane of the pivot below the horizontal plane of the pivotal point, said means being of equal specific gravity and also equidistant each side laterally of the pivotal point.

This specification signed this 30th day of April, 1924.

HUGH M. CAMERON.